Jan. 16, 1934.  W. E. McCARRON  1,943,614
TRUCK LOADER
Filed Oct. 19, 1931
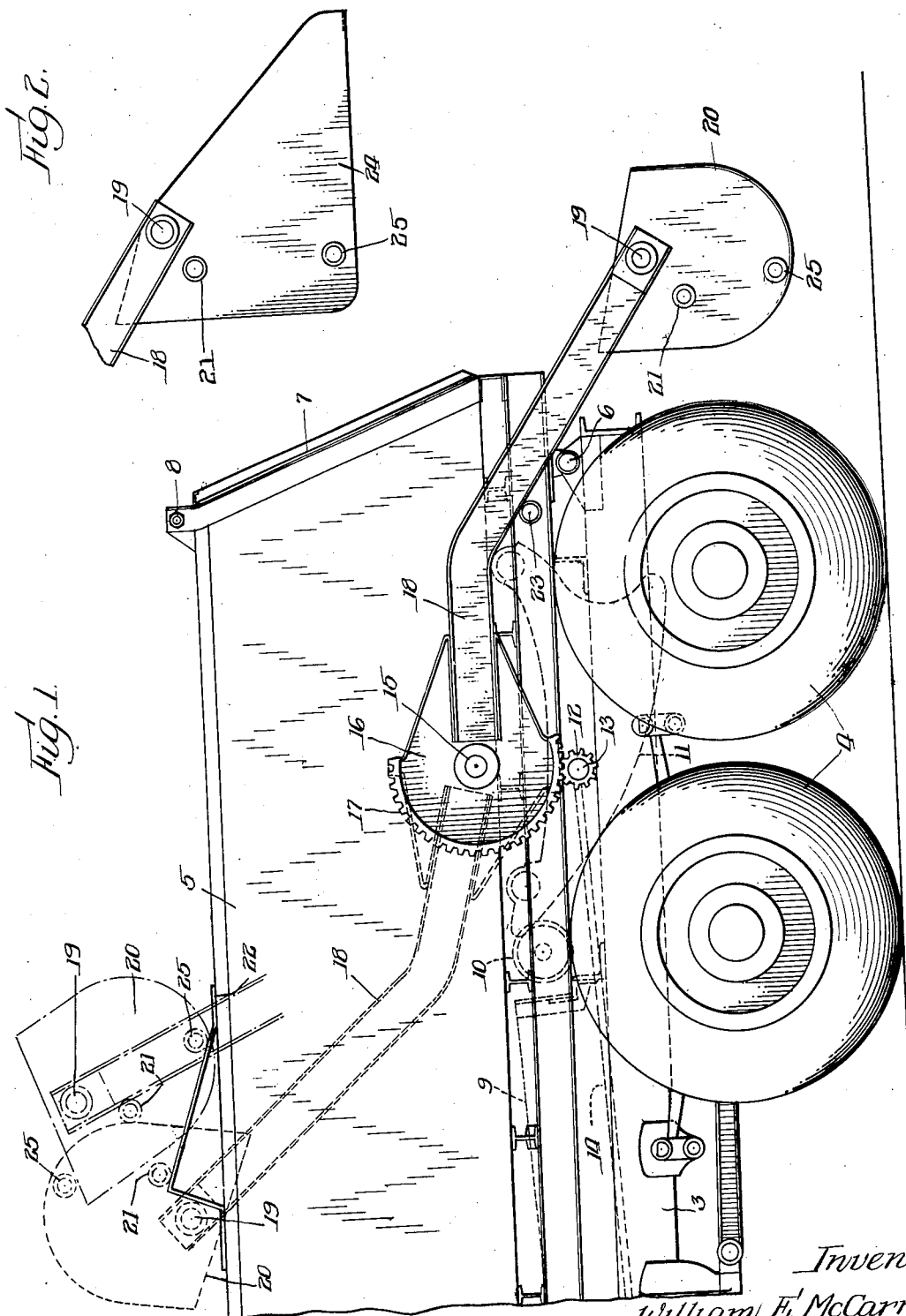
Inventor
William E. McCarron
By Kent W. Wonnell attys.

Patented Jan. 16, 1934

1,943,614

UNITED STATES PATENT OFFICE 1,943,614

TRUCK LOADER

William E. McCarron, Chicago, Ill.

Application October 19, 1931. Serial No. 569,727

8 Claims. (Cl. 214—78)

This invention relates in general to a loader for power vehicles and has more particular reference to a receptacle which is mounted at the sides of a truck to swing a loaded bucket upwardly and discharge the contents into a truck.

One of the principal objects of the invention is in the provision of loading mechanism which may be applied to existing trucks with very little trouble and expense to equip it for easier loading and for power operation and to make the truck available for quicker service and different uses.

Other objects of the invention will appear hereinafter, the accompanying drawing illustrating a preferred embodiment of the invention. In the drawing, Fig. 1 is a side elevation of a portion of a dumping truck to which the present invention is applied; and Fig. 2 is a side elevation of a scoop adapted to rest on the ground.

In loading an ordinary truck it is customary to shovel the material from the ground level into the open truck body which requires a high lift of the shovel which makes the work very laborious and difficult, and also takes considerable time and results in more or less spilling of the material. Because of the high lift the workmen also take smaller loads so that the loading of a truck takes considerable time and energy. Also in the handling of ashes, garbage and the like from barrels and containers, it is impractical to lift heavy containers to the top of the truck.

The present invention provides a receptacle which is located in loading position at the normal height at which such a barrel or receptacle will be carried and at such a height that it is easily filled from the ground or with a shovel without raising the material above a height that is easily reached without stretching or straining. The result is that materials are deposited therein more quickly, in larger batches or loads, with less spillage and with less physical exertion. After the receptacle is filled it is rotated upwardly by power of the vehicle and discharged automatically into the truck body.

Referring now more particularly to the drawing, a portion of a motor vehicle truck is illustrated having a frame 3 supported by wheels 4 and carrying an open truck body 5 mounted at the rear of the frame upon a pivot 6 so that the body may be tipped upwardly about the pivot 6 to discharge the contents thereof through a rear door 7 mounted upon a pivot 8. The upward tipping of the truck body may be accomplished in any suitable manner, as by means of a plunger operated by a cylinder 9 and carrying a roller 10 which engages a cam member 11 secured to the bottom of the truck body so that the outward movement of the plunger carrying the roller 10 will raise the truck body and the reverse movement will allow it to lower due to its own weight.

The present invention comprises a power gear 12 mounted on a cross shaft 13 extending through the side frame 3 of the vehicle and actuated at the will of the truck operator by means of a shaft 14 which receives its power from the truck engine or from a separate motor and can be operated in either direction. This invention does not depend upon the specific construction of the tilting truck body or of this power drive, and power drive pulleys or gears, such as the gears 12, are commonly provided on truck bodies for power purposes.

Mounted at each end of a shaft 15 extending through the truck body or its frame is a support 16 which carries a curved rack or gear segment 17 adapted to mesh with the driving gear 12 at its side of the frame. This support also carries a supporting arm 18 which is inclined at its outer end to provide a support for a pivot 19 in which a receptacle 20 is mounted. This receptacle may be in the form of a bucket and extends transversely between the arms 18 at opposite sides of the vehicle so that it will carry a substantial load and it is supported at such a height that it is easily reached and filled either by shoveling or by lifting a barrel, basket or other receptacle thereto.

This receptacle 20 is mounted for free turning movement upon the pivots 19 but at each end of the receptacle are one or more roller projections 21 and 25 adapted to engage a dumping bracket member 22 on the upper edge of the truck body 5, when the arms 18 are raised. As the arms 18 are moved over the truck body 5 the lower projections 25 first engage the members 22 and roll along the brackets to increasingly incline the receptacle 20 and then the projections 21 engage the members 22 to complete the overturning movement.

To raise and lower the receptacle the driving gears 12 are rotated in opposite directions, at will, by means of the power shaft 14, or in any other suitable manner. In the bucket type of receptacle it is desirable to support it at a height slightly above the ground and a projection or stop 23 may be provided on the truck frame to engage the arm 18 in its lower position. If the receptacle is intended to rest upon the ground this projection 23 may be omitted.

If it is desired to use the loader for power loading, the loading receptacle may be in the form of a shovel 24, as shown in Figure 2, adapted to rest upon the ground and to be moved by the vehicle itself into the material to be loaded. When the shovel is sufficiently loaded the raising mechanism is operated and the shovel is discharged the same as in the form shown by Figure 1.

Either of these forms of loaders is designed and intended to be applied either as an attachment to existing trucks or to be built thereon as original equipment, it being necessary only to so position the pivoting shaft 15 that the gear 17 will mesh with the driving gear 12 and to make the length of the arm 18 such that it will clear the truck body.

When the truck body is raised for dumping, or even if it is removed from the vehicle truck, no operative attention to the loader is necessary as the teeth of the gear 17 merely become disengaged from the driving gear 12 and when the truck body is again positioned upon the vehicle body the gear teeth will again intermesh in driving relation.

I claim:

1. A loader for a vehicle having a frame and a truck body pivoted thereon and power means at the sides of the frame, comprising loading arms at the sides of the truck body and a pivot support for the arms engaging the driving means only when the truck body is in load carrying position, a loading receptacle movable with the arms and pivoted therebetween, projections on the receptacle below the pivotal mounting thereof and an inclined bracket at the top of the truck body to engage first one and then the other projection in overturning the receptacle.

2. In a loader for vehicle trucks, an arm, a pivoted support therefor, a receptacle pivoted at the free end of the arm, and means comprising projections on the receptacle below the pivotal mounting and a cam bracket at the upper edge of the truck for engaging the receptacle with the truck bracket and overturning it progressively during the turning movement of the arm.

3. In a vehicle truck loader, supports pivoted at the sides of the truck, arms extending from the supports, a receptacle pivotally carried by the arms, and means including a projection below the pivotal mounting of the receptacle and an engageable dumping bracket at the upper edge of a truck side to engage the projection of the receptacle and overturn it.

4. In a vehicle truck loader, supports pivoted at the sides of the truck, arms extending from the supports, a receptacle pivoted to the free ends of the arms and extending between them, means comprising a projection on the receptacle and a bracket on the upper edge of the side of the truck for engaging the projection for partially overturning the receptacle during the turning movement of the arms, and additional means on the receptacle for engaging the bracket to complete the overturning of the receptacle at the end of its loading movement.

5. The combination with a vehicle truck, comprising a frame, of a truck body pivoted thereto, a power gear extending from the side of the vehicle frame, a support pivoted at the side of the truck body having a gear portion to engage with the power gear and to be disengaged therefrom when the truck body is raised, an arm extending from the support, a receptacle carried by the arm, and means comprising projections on the receptacle and a dumping bracket at the top of the body to engage them in succession for overturning the receptacle in its raised position over the truck body.

6. In a loader for vehicle trucks, the combination of a truck body adapted to be raised and lowered, a driving gear in connection with the vehicle frame, means for raising and lowering the truck body in the vehicle frame, a support pivoted to the truck body having a gear portion in engagement with the driving gear and moved out of engagement when the truck body is raised in the vehicle frame, an arm extending from the support, a receptacle pivoted to the arm, means comprising a projection in connection with the receptacle for engaging the truck to partially overturn the receptacle when the arm is raised, and means comprising a dumping bracket in connection with the truck body for engaging the receptacle to completely overturn it at the end of the loading movement of the arm.

7. In a vehicle truck loader, supports pivoted at the sides of the truck, arms extending from the supports, a receptacle pivoted to the arms and extending between them, the receptacle being in the form of a scoop and adapted to rest upon the ground at the rear of a vehicle for filling it by the rearward movement of the vehicle, and means comprising projections on the receptacle below its pivotal support and an inclined dumping bracket on the truck for engaging the projections progressively in succession and dumping the receptacle.

8. The combination with a vehicle truck body, of a member pivoted to the side thereof and comprising a gear portion adapted to engage a power gear for rotating it in opposite directions, an arm extending from the support, a receptacle pivotally carried by the free end of the arm, projections on the receptacle and an inclined bracket on the body for engaging the projections in succession as the arm is moved and overturning the receptacle, and a stop in connection with the truck body for engaging the arm in its lower position for holding the receptacle above the ground in loading position.

WILLIAM E. McCARRON.